(12) United States Patent
Luo

(10) Patent No.: US 7,561,194 B1
(45) Date of Patent: Jul. 14, 2009

(54) CHARGE DIFFUSION CROSSTALK REDUCTION FOR IMAGE SENSORS

(75) Inventor: Qiang Luo, Santa Clara, CA (US)

(73) Assignee: Eastman Kodak Company, Rochester, NY (US)

( * ) Notice: Subject to any disclaimer, the term of this patent is extended or adjusted under 35 U.S.C. 154(b) by 970 days.

(21) Appl. No.: 10/688,657

(22) Filed: Oct. 17, 2003

(51) Int. Cl.
*H04N 5/217* (2006.01)
*G06K 9/00* (2006.01)

(52) U.S. Cl. ........................ 348/241; 382/167

(58) Field of Classification Search ............... 348/222.1, 348/241; 382/167
See application file for complete search history.

(56) References Cited

U.S. PATENT DOCUMENTS

| | | | | |
|---|---|---|---|---|
| 5,673,336 | A * | 9/1997 | Edgar et al. | 382/167 |
| 6,965,692 | B1 * | 11/2005 | Ford | 382/167 |
| 6,970,597 | B1 * | 11/2005 | Olding et al. | 382/167 |
| 7,102,669 | B2 * | 9/2006 | Skow | 348/222.1 |
| 2002/0181770 | A1 * | 12/2002 | Jaspers | 382/167 |
| 2003/0030729 | A1 * | 2/2003 | Prentice et al. | 348/220.1 |
| 2005/0057655 | A1 * | 3/2005 | Duesman et al. | 348/187 |

OTHER PUBLICATIONS

Orly Yadid-Pecht; *Geometrical Modulation Transfer Function for Different Pixel Active Area Shapes*; Optical Engineering, vol. 39, No. 4 Apr. 2000; pp. 859-865.

Igor Shcherback and Orly Yadid-Pecht; *CMOS APS MTF Modeling*; IEEE Transactions on Electron Devices; vol. 48, No. 12, Dec. 2001; pp. 2710-2715.

C. Marques, P. Magnan; *Experimental Characterization and Simulation of Quantum Efficiency and Optical Crosstalk of CMOS Photodiode APS*; Proceedings of SPIE, vol. 4669; Jan. 21-23, 2002; pp. 107-116.

J. S. Lee, J. Shah, M. Ed Jernigan, and R. I. Hornsey; *Empirical Characterization of Lateral Crosstalk for CMOS Image Sensors and Deblurring Operations*; IEEE Workshop on Charge-Coupled Devices and Advanced Image Sensors, Schloss Elmau, Elmau, Germany, 2003.

Kenneth A. Parulski et al., High-performance digital color video camera, Journal of Electronic Imaging, Jan. 1992, vol. 1(1), pp. 35-45.

\* cited by examiner

*Primary Examiner*—Timothy J Henn
(74) *Attorney, Agent, or Firm*—Nancy R. Simon

(57) ABSTRACT

A charge diffusion crosstalk reduction process is provided for image signals from, for example, a CMOS image sensor. Charge diffusion crosstalk processing can be used in accordance with aspects of the present invention to reduce charge diffusion crosstalk caused by electrons migrating from adjacent pixels. Crosstalk effects can be determined by color gain and color offset. By adjusting the color gain and color offset, crosstalk can be cancelled to the first order. Charge diffusion crosstalk processing in accordance with aspects of the present invention can be relatively easily integrated with color correction processing during the post processing of image sensors. Color correction and cross talk cancellation processing can use the same circuitry as previously used before by color correction process only. The input coefficients for color correction and cross talk cancellation processing can be determined from the results of the multiplication of color correction matrix $\underline{C}$ and crosstalk cancellation matrix $\underline{K}^{-1}$.

16 Claims, 5 Drawing Sheets

| 111 R | 112 G | 113 R | 114 G |
|---|---|---|---|
| 121 G | 122 B | 123 G | 124 B |
| 131 R | 132 G | 133 R | 134 G |
| 141 G | 142 B | 143 G | 144 B |

CHARGE DIFFUSION CROSSTALK REDUCTION FOR IMAGE SENSORS

FIELD OF THE INVENTION

The present invention relates generally to image processing, and more particularly to image processing in color CMOS image sensors.

BACKGROUND OF THE INVENTION

Electronic image sensors are widely used to produce video and photographic images. The electronic image sensors typically comprise pixel sensors that are arranged in an array of rows and columns. The image sensors typically read pixel values by using a horizontal scan circuit to sequentially address pixel columns. A charge amplifier is often used to read the charge of pixels within the addressed pixel columns.

As pixel pitches decrease, charge diffusion crosstalk increases. The crosstalk between neighboring pixels causes color-shifting problems in the image captured by the electronic sensor. Color-shifting occurs when monochromatic light (e.g., red, green, or blue) is shifted from its true color a result of the addition of diffused charge from neighboring pixels of different colors. The effect of color-shifting increases as pixel pitch decreases. Crosstalk is a function of doping concentration, charge free running distance and layout structure. For small pixels (e.g., 3.2 um pitch pixel with 0.18 um advanced CMOS processing), crosstalk of red light can be as high as 20%, which can cause very noticeable color-shifting in a captured image.

An appreciation of the present invention and its improvements can be obtained by reference to the accompanying drawings, which are briefly summarized below, to the following detailed description of illustrated embodiments of the invention, and to the appended claims.

BRIEF DESCRIPTION OF THE DRAWINGS

FIG. 1 is a schematic diagram of an example color filter mask pattern for a CMOS image sensor used in accordance with the present invention.

DETAILED DESCRIPTION OF THE PREFERRED EMBODIMENT

Figure 2:
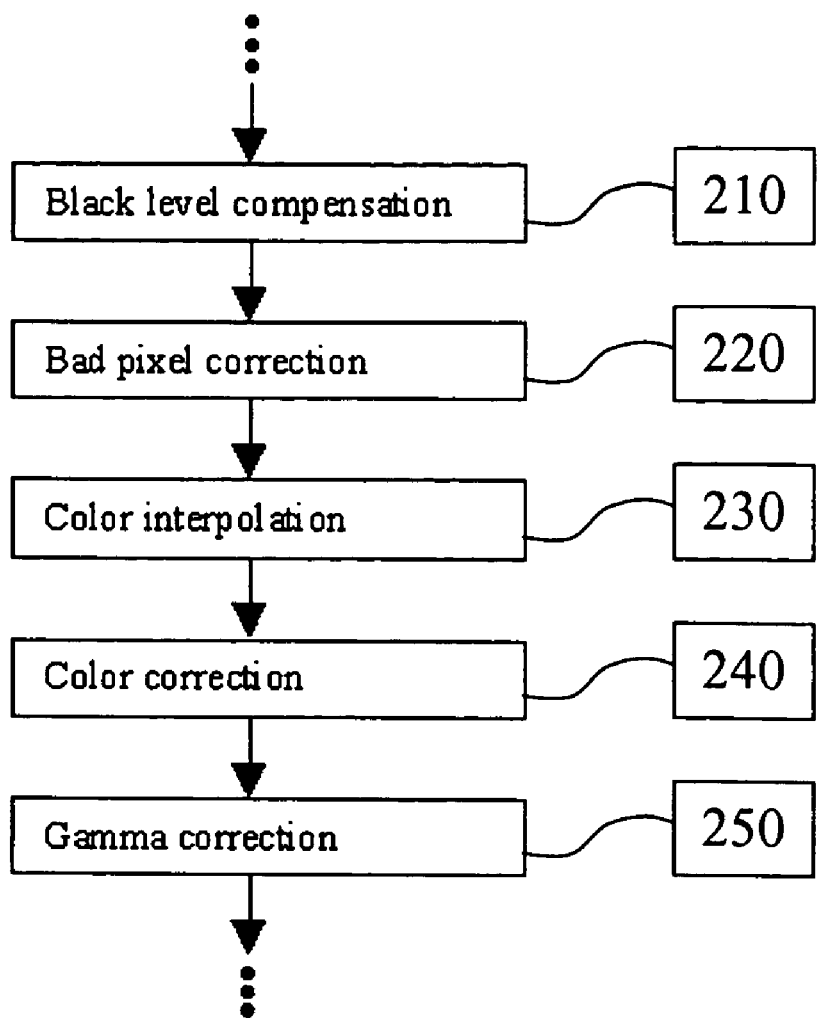
FIG. 2 is a flow diagram of digital post-processing of an image signal from an image sensor in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

CMOS image sensors typically comprise pixel cells (i.e., pixels) that are arranged in an array. Each pixel typically comprises a reset circuit and a photodiode, which are used to produce a pixel signal level in accordance with the intensity of incident light. In operation, the reset circuit is used to charge the pixel to a highest level. Exposure of the photodiode to light causes the photodiode to produce a stray current, which reduces the charge of the pixel over time. Thus, the pixel signal level is integrated by exposing the pixel to light. The amount of integration is dependent upon the intensity of incident light upon the pixel and the sensitivity of the pixel.

A color filter mask is typically superimposed over the pixel array such that each pixel is covered with a monochromatic filter of a certain color and that no two adjacent pixels have filters of the same color. Color shifting occurs when the incident light upon a certain pixel causes free electrons in the substrate below the pixel to diffuse to neighboring pixels. This erroneously causes the pixel (which represents a different color than the pixel from which the diffused electrons originated) to be increased beyond the "true" representation of the image to be captured.

A charge diffusion crosstalk reduction process is provided for image signals from, for example, a CMOS image sensor. Charge diffusion crosstalk processing can be used in accordance with aspects of the present invention to reduce charge diffusion crosstalk caused by electrons migrating from adjacent pixels. Crosstalk effects can be determined by color gain and color offset. By adjusting the color gain and color offset, crosstalk can be cancelled to the first order. Charge diffusion crosstalk processing in accordance with aspects of the present invention can be relatively easily integrated with color correction processing during the post processing of image sensors. Color correction and cross talk cancellation processing can use the same circuitry as previously used before by color correction process only. The input coefficients for color correction and cross talk cancellation processing can be determined from the results of the multiplication of color correction matrix $\underline{\underline{C}}$ and crosstalk cancellation matrix $\underline{\underline{K}}^{-1}$.

FIG. 1 is a schematic diagram of an example color filter mask pattern for a CMOS image sensor used in accordance with the present invention. For simplicity, only a small, representative portion of pattern 100 is shown. The figure illustrates a Bayer pattern, which is arranged using an R (red) G (green) B (blue) format. (Other patterns and colors are possible for the color filter mask.) Each block (e.g., 111) represents a pixel upon which a color filter (red, green, or blue) has been placed on top of the pixel in accordance with the selected pattern. For example, pixel 122 comprises a blue filter, pixel 123 comprises a green filter, and pixel 133 comprises a red filter.

A majority of "stray" diffused electrons in a particular pixel originate from the eight surrounding pixels that surround the particular pixel. The degree to which the electrons migrate to surrounding pixels is a function of the depth to which monochromatic light travels in the substrate of the pixels from which the electrons originate. Blue light reaches only to a shallow depth from the surface of silicon. Green light reaches more deeply, while red light reaches most deeply.

Usually, field oxide and/or p or p+ type material is placed between pixels to reduce the number of electrons generated between the surface and about 1 um depth from the surface from diffusing to neighboring pixels. Accordingly, the crosstalk percentage of blue light is the smallest. The crosstalk percentage of green light is higher and that of red light is highest.

For red pixels (e.g., pixel 133), crosstalk mainly originates from within the green pixels (e.g., pixels 123, 132, 134, and 143) beside it. A lesser amount of crosstalk originates from within the blue pixels (e.g., pixels 124 and 142) at the corners of the 3×3 array. For green pixels (e.g., pixel 123), the crosstalk mainly originates from within the red pixels (e.g., pixels 113 and 133) beside it. A lesser amount of crosstalk originates from within the adjacent blue pixels (e.g., pixels 122 and 124) and the adjacent red pixels (e.g., pixels 113 and 133). For blue pixels (e.g., pixel 122), the crosstalk mainly originates from within the adjacent green pixels (e.g., pixels 112, 121, 123, and 132) and the red pixels (e.g., pixels 111, 113, 131, and 133) at the corners of the 3×3 array.

To simplify processing requirements, the same-colored pixels are assumed to have same value in a 4×4 array (as shown, for example, in the figure). The crosstalk from the center pixel to its upper, lower, right and left neighbors is assumed to be the same and the crosstalk from the center pixel to its upper left, upper right, lower left and lower right neighbors is also assumed to be the same. Additionally, only crosstalk within a 3×3 array is considered.

Coefficients for representing crosstalk between pixels are defined as in Table 1, below.

TABLE 1

| coefficient | description | direction |
|---|---|---|
| $k_{rg}$ | Cross talk from red pixel to green pixel | Horizontally or vertically |
| $k_{rb}$ | Cross talk from red pixel to blue pixel | Diagonally |
| $k_{bg}$ | Cross talk from blue pixel to green pixel | Horizontally or vertically |
| $k_{br}$ | Cross talk from blue pixel to red pixel | Diagonally |
| $k_{gb}$ | Cross talk from green pixel to blue pixel | Horizontally or vertically |
| $K_{gr}$ | Cross talk from green pixel to red pixel | Horizontally or vertically |

The measured value of each pixel is actually the summation of the true (i.e., desired) value and the crosstalk contribution. In the equations below, R, G and B denote the measured values of red, green and blue pixels and $R_0$, $G_0$ and $B_0$ denote the true value of red, green and blue pixels. The relationship between the measured value and true value can be expressed by the following equations:

$$R = R_0 - 4k_{rg}R_0 - 4k_{rb}R_0 + 4k_{gr}G_0 + 4k_{br}B_0 \quad (1)$$

$$G = G_0 - 2k_{gb}G_0 - 2k_{gr}G_0 + 2k_{bg}B_0 + 2k_{rg}R_0 \quad (2)$$

$$B = B_0 - 4k_{bg}B_0 - 4k_{br}B_0 + 4k_{gb}G_0 + 4k_{rb}R_0 \quad (3)$$

or $$\begin{bmatrix} R \\ G \\ B \end{bmatrix} = \begin{bmatrix} 1 - 4k_{rg} - 4k_{rb} & 4k_{gr} & 4k_{br} \\ 2k_{rg} & 1 - 2k_{gb} - 2k_{gr} & 2k_{bg} \\ 4k_{rb} & 4k_{gb} & 1 - 4k_{bg} - 4k_{br} \end{bmatrix} \cdot \begin{bmatrix} R_o \\ G_o \\ B_o \end{bmatrix} \quad (4)$$

$$= \underline{K} \cdot \begin{bmatrix} R_o \\ G_o \\ B_o \end{bmatrix} \quad (5)$$

where $\underline{K}$ denotes the 3×3 coefficients matrix in equation (4).

Equation (4) shows that the measured pixel value has the format of measured_value=gain·true_value+offset. Accordingly, crosstalk contributes to both color gain and color offset effects. To reduce these effects, both gain and offset calibrations can be used. From equation (5), the true values of red, green and blue pixels can be expressed as $$\begin{bmatrix} R_0 \\ G_0 \\ B_0 \end{bmatrix} = \underline{K}^{-1} \cdot \begin{bmatrix} R \\ G \\ B \end{bmatrix} \quad (6)$$

The $\underline{K}^{-1}$ array can be determined by the six coefficients shown in Table 1, which can be measured from test chips in advance. When the coefficients of Table 1 are known, the true value of pixels can be calculated according to equation (6). Accordingly, the $\underline{K}^{-1}$ array plays the roll of providing gain and offset calibration for processing a captured image.

FIG. 2 is a flow diagram of digital post-processing of an image signal from an image sensor in accordance with the present invention. In block 210, black level compensation is performed to establish a black level for the image signal. In block 220, "bad" pixels are compensated for by, for example, averaging neighboring pixel values. In block 230, color interpolation is performed. In block 240, color correction is performed (as described immediately below). In block 250, gamma correction can be performed.

Color correction (of block 240) can be used to improve the color filter spectral response with regards to wavelength selectivity. Color correction can be used to suppress other color components present in a colored pixel (e.g. with color filter on). The function of this process is also to adjust the color gain and subtract other color components, which is similar in form to equation (6). Accordingly, crosstalk calibration can be used with color processing. An equation for color correction processing can be described as $$\begin{bmatrix} R' \\ G' \\ B' \end{bmatrix} = \begin{bmatrix} c_{11} & -c_{12} & -c_{13} \\ -c_{21} & c_{22} & -c_{23} \\ -c_{31} & -c_{32} & c_{33} \end{bmatrix} \cdot \begin{bmatrix} R \\ G \\ B \end{bmatrix} \quad (7)$$

$$= \underline{C} \cdot \begin{bmatrix} R \\ G \\ B \end{bmatrix} \quad (8)$$

where R', G' and B' are the output values of the color correction block. Crosstalk calibration can be used with the color correction process as shown in FIG. 3.

Figure 3:
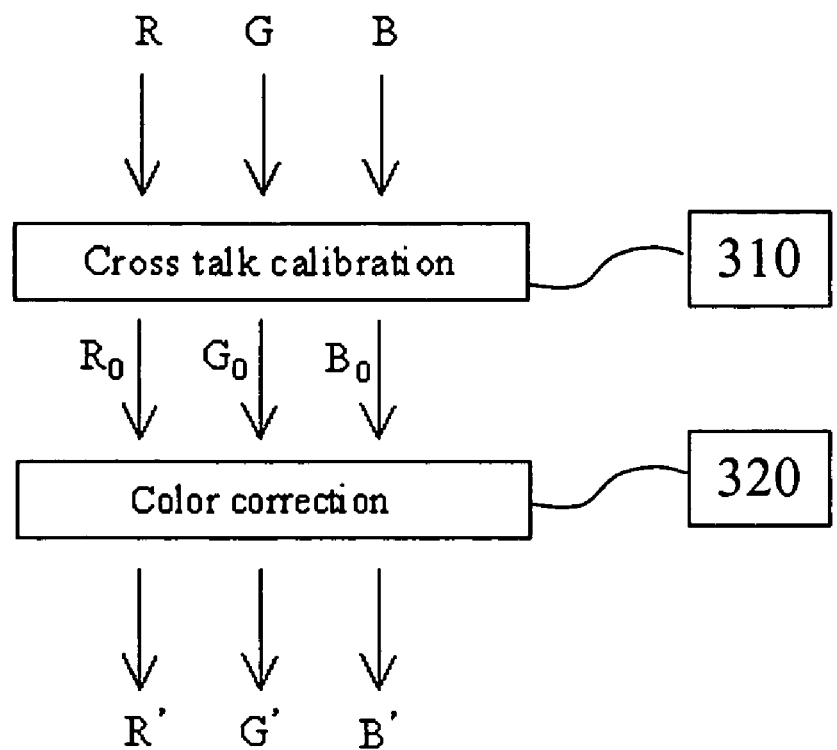
FIG. 3 is a flow diagram of using crosstalk calibration and color correction during digital post-processing of an image signal from an image sensor in accordance with the present invention.

FIG. 3 is a flow diagram of using crosstalk calibration and color correction during digital post-processing of an image signal from an image sensor in accordance with the present invention. For example, crosstalk calibration (310) can be performed before color correction (320).

The output of the cross talk calibration block and the color correction block can be expressed as:

$$\begin{bmatrix} R' \\ G' \\ B' \end{bmatrix} = \underline{C} \cdot \begin{bmatrix} R_0 \\ G_0 \\ B_0 \end{bmatrix} = \underline{C} \cdot \underline{K}^{-1} \cdot \begin{bmatrix} R \\ G \\ B \end{bmatrix} = \underline{T} \cdot \begin{bmatrix} R \\ G \\ B \end{bmatrix} \quad (9)$$

where $\underline{T} = \underline{C} \cdot \underline{K}^{-1}$. Accordingly, color correction processing and crosstalk calibration processing can be merged without substantial changes to the processing circuitry. The combined function typically can be realized by providing different matrix elements to existing circuitry.

Figure 4:
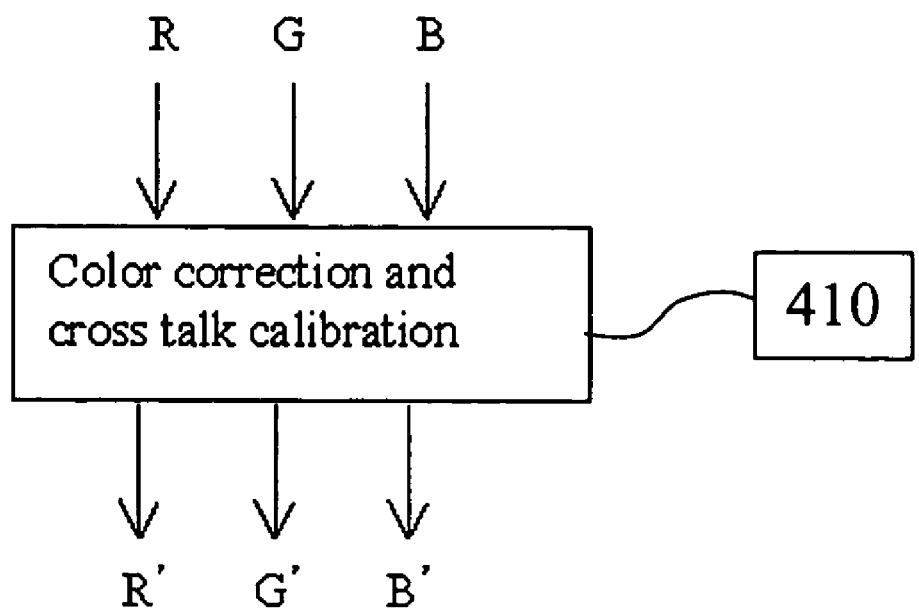
FIG. 4 is a flow diagram of combining crosstalk calibration with color correction during digital post-processing of an image signal from an image sensor in accordance with the present invention.

FIG. 4 is a flow diagram of combining crosstalk calibration with color correction during digital post-processing of an image signal from an image sensor in accordance with the present invention. Block 410 is a representation of combining crosstalk calibration with color correction.

Figure 5:
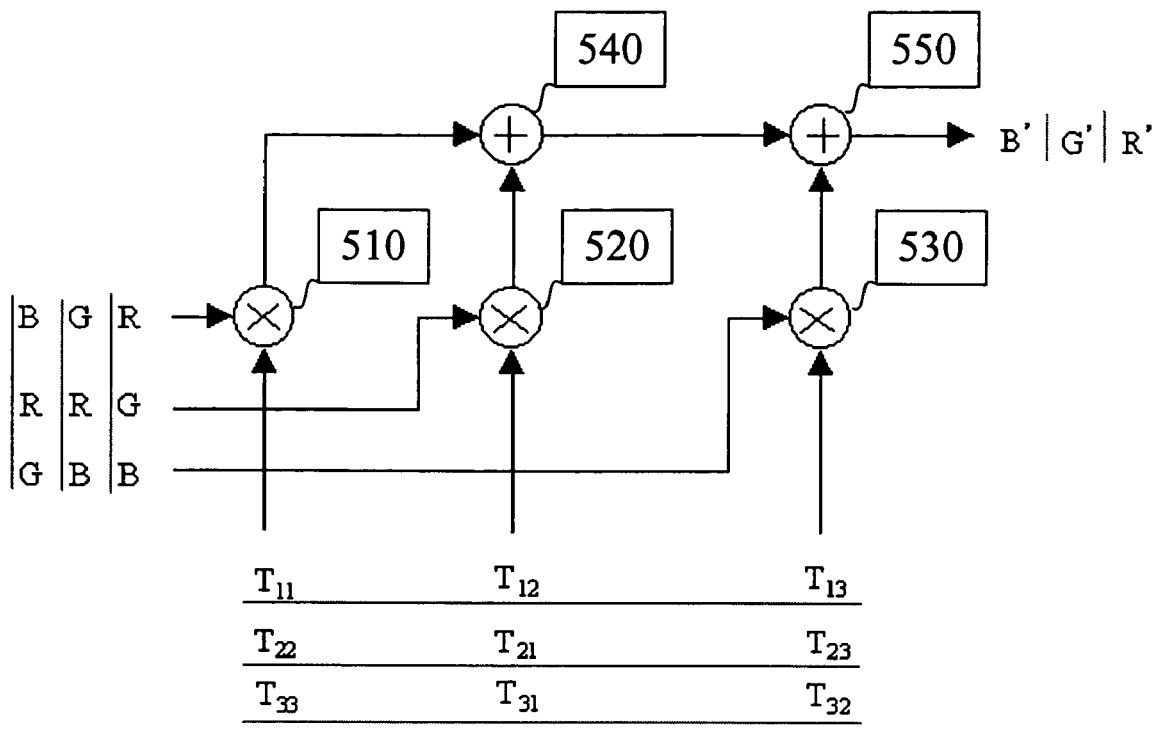
FIG. 5 is a signal flow diagram for digital post-processing of an image signal from an image sensor in accordance with the present invention.

FIG. 5 is a signal flow diagram for digital post-processing of an image signal from an image sensor in accordance with the present invention. As can be seen from the figure, the complete algorithm can be implemented using just three multipliers (510, 520, and 530) and two adders (540 and 550). The elements of the matrix $\underline{T}$ are typically all programmable.

Charge diffusion crosstalk processing can be used in accordance with aspects of the present invention to reduce crosstalk effects to the first order. The processing can be integrated with current digital processing without adding extra circuitry. After integrating the cross talk cancellation with color correction, a captured image will typically have more vivid-looking colors.

Various embodiments of the invention are possible without departing from the spirit and scope of the invention. For example, color systems other than RGB can be used. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for reducing charge diffusion crosstalk in an image sensor having a plurality of pixels disposed in a substrate and a color filter mask positioned over the plurality of pixels such that each pixel is covered with a monochromatic filter of a certain color and that no two adjacent pixels have filters of the same color, wherein the certain colors of the monochromatic filters comprise red, green and blue, the method comprising:
   sampling a first pixel to produce a first measured pixel value;
   sampling a group of adjacent pixels immediately surrounding the first pixel to produce adjacent measured pixel values;
   applying diffusion crosstalk coefficients applicable to the first pixel to the measured value of the first pixel and the measured values of the adjacent pixels to generate a calculated first pixel value that is corrected for charge diffusion crosstalk, wherein the crosstalk coefficients are applied using the equations $$\begin{bmatrix} R \\ G \\ B \end{bmatrix} = \begin{bmatrix} 1 - 4k_{rg} - 4k_{rb} & 4k_{gr} & 4k_{br} \\ 2k_{rg} & 1 - 2k_{gb} - sk_{gr} & 2k_{bg} \\ 4k_{rb} & 4k_{gb} & 1 - 4k_{bg} - 4k_{br} \end{bmatrix} \begin{bmatrix} R_o \\ G_o \\ B_o \end{bmatrix}$$

where R, G, and B denote measured values of red, green and blue pixels, Ro, Go and Bo denote corrected values of red, green and blue pixels, $k_{rg}$ denotes the crosstalk from a red pixel to a green pixel, $k_{rb}$ denotes the crosstalk from a red pixel to a blue pixel, $k_{bg}$ denotes the crosstalk from a blue pixel to a green pixel, $k_{br}$ denotes the crosstalk from a blue pixel to a red pixel, $k_{gb}$ denotes the crosstalk from a green pixel to a blue pixel, and $k_{gr}$ denotes the crosstalk from a green pixel to a red pixel.

2. The method of claim 1, wherein the group of adjacent pixels of different colors are of two colors that are different from the first color.

3. The method of claim 1, further comprising applying color correction coefficients to the first measured pixel value and the adjacent measured pixel values such that the first pixel color filter spectral response is improved in the first measured pixel value.

4. The method of claim 3, wherein the crosstalk coefficients and the color correction coefficients are combined.

5. The method of claim 1, wherein the crosstalk coefficients are combined with color correction coefficients before the crosstalk coefficients are applied to the first measured pixel value.

6. The method of claim 1, wherein the crosstalk coefficients are applied using no more than three multipliers and no more than two adders.

7. An apparatus for reducing charge diffusion crosstalk in an image sensor having a plurality of pixels disposed in a substrate and a color filter mask positioned over the plurality of pixels such that each pixel is covered with a monochromatic filter of a certain color and that no two adjacent pixels have filters of the same color, wherein the certain colors of the monochromatic filters comprise red, green, and blue, the apparatus comprising:
   means for inputting crosstalk coefficients for a first pixel of a first color for reducing diffusion crosstalk caused by electrons migrating to the first pixel from adjacent pixels of colors that are different from the first color;
   means for sampling the first pixel to produce a first measured pixel value;
   means for sampling a group of the adjacent pixels immediately surrounding the first pixel to produce adjacent measured pixel values; and
   means for applying the crosstalk coefficients to the first measured pixel value and the adjacent measured pixel values such that crosstalk effects are corrected for in the first measured pixel value, wherein the crosstalk coefficients are applied using the equations $$\begin{bmatrix} R \\ G \\ B \end{bmatrix} = \begin{bmatrix} 1 - 4k_{rg} - 4k_{rb} & 4k_{gr} & 4k_{br} \\ 2k_{rg} & 1 - 2k_{gb} - sk_{gr} & 2k_{bg} \\ 4k_{rb} & 4k_{gb} & 1 - 4k_{bg} - 4k_{br} \end{bmatrix} \begin{bmatrix} R_o \\ G_o \\ B_o \end{bmatrix}$$

where R, G and B denote measured values of red, green and blue pixels, Ro, Go and Bo denote corrected values of red, green and blue pixels, $k_{rg}$ denotes the crosstalk from a red pixel to a green pixel, $k_{rb}$ denotes the crosstalk from a red pixel to a blue pixel, $k_{bg}$ denotes the crosstalk from a blue pixel to a green pixel, $k_{br}$ denotes the crosstalk from a blue pixel to a red pixel, $k_{gb}$ denotes the crosstalk from a green pixel to a blue pixel, and $k_{gr}$ denotes the crosstalk from a green pixel to a red pixel.

8. The apparatus of claim 7, wherein the group of adjacent pixels of different colors are of two colors that are different from the first color.

9. The apparatus of claim 7, further comprising means for applying color correction coefficients to the first measured pixel value and the adjacent measured pixel values such that the first pixel color filter spectral response is improved in the first measured pixel value.

10. The apparatus of claim 9, wherein the crosstalk coefficients and the color correction coefficients are combined.

11. The apparatus of claim 7, wherein the crosstalk coefficients are combined with color correction coefficients before the crosstalk coefficients are applied to the first measured pixel value.

12. The apparatus of claim 7, wherein the crosstalk coefficients are applied using no more than three multiplier means and no more than two adder means.

13. An apparatus for reducing charge diffusion crosstalk, in an image sensor having a plurality of pixels disposed in a substrate and a color filter mask positioned over the plurality of pixels such that each pixel is covered with a monochromatic filter of a certain color and that no two adjacent pixels have filters of the same color, wherein the certain colors of the monochromatic filters comprise red, green, and blue, the apparatus comprising:
 a first pixel that is arranged to produce a first measured pixel value in response to received filtered light;
 a group of adjacent pixels immediately surrounding the first pixel that are arranged to produce adjacent measured pixel values in response to received filtered light on each pixel of the group of adjacent pixels;
 a memory comprising crosstalk coefficients for correcting for diffusion crosstalk caused by electrons migrating to the first pixel from adjacent pixels of colors that are different from the first color; and
 an arithmetic processor that is configured to apply the crosstalk coefficients to the first measured pixel value and the adjacent measured pixel values such that first order crosstalk effects are corrected for in the first measured pixel value, wherein the crosstalk coefficients are applied using the equations $$\begin{bmatrix} R \\ G \\ B \end{bmatrix} = \begin{bmatrix} 1 - 4k_{rg} - 4k_{rb} & 4k_{gr} & 4k_{br} \\ 2k_{rg} & 1 - 2k_{gb} - sk_{gr} & 2k_{bg} \\ 4k_{rb} & 4k_{gb} & 1 - 4k_{bg} - 4k_{br} \end{bmatrix} \begin{bmatrix} R_o \\ G_o \\ B_o \end{bmatrix}$$

where R, G and B denote measured values of red, green and blue pixels, Ro, Go and Bo denote corrected values of red, green and blue pixels, $k_{rg}$ denotes the crosstalk from a red pixel to a green pixel, $k_{rb}$ denotes the crosstalk from a red pixel to a blue pixel, $k_{bg}$ denotes the crosstalk from a blue pixel to a green pixel, $k_{br}$ denotes the crosstalk from a blue pixel to a red pixel, $k_{gb}$ denotes the crosstalk from a green pixel to a blue pixel, and $k_{gr}$ denotes the crosstalk from a green pixel to a red pixel.

14. The apparatus of claim 13, wherein the group of adjacent pixels of different colors are of two colors that are different from the first color.

15. The apparatus of claim 13, wherein the arithmetic processor is further configured to apply color correction coefficients to the first measured pixel value and the adjacent measured pixel values such that the first pixel color filter spectral response is improved in the first measured pixel value.

16. The apparatus of claim 13, wherein the crosstalk coefficients are applied using no more than three multiplier means and no more than two adder means.

* * * * *